(12) United States Patent
Albert

(10) Patent No.: US 10,336,179 B2
(45) Date of Patent: Jul. 2, 2019

(54) HYDRAULIC MOTOR FOR VEHICLE WHEEL

(71) Applicant: Laurent Eugéne Albert, Frignicourt (FR)

(72) Inventor: Laurent Eugéne Albert, Frignicourt (FR)

( * ) Notice: Subject to any disclaimer, the term of this patent is extended or adjusted under 35 U.S.C. 154(b) by 184 days.

(21) Appl. No.: 15/542,982

(22) PCT Filed: Dec. 18, 2015

(86) PCT No.: PCT/EP2015/080483
§ 371 (c)(1),
(2) Date: Jul. 31, 2017

(87) PCT Pub. No.: WO2016/097290
PCT Pub. Date: Jun. 23, 2016

(65) Prior Publication Data
US 2018/0009312 A1    Jan. 11, 2018

(30) Foreign Application Priority Data
Dec. 19, 2014    (FR) .................................... 14 62934

(51) Int. Cl.
*B60K 7/00*      (2006.01)
*B60T 1/06*      (2006.01)
*B60T 13/12*     (2006.01)
*B60T 13/22*     (2006.01)
*F03C 1/047*     (2006.01)
*B60K 17/10*     (2006.01)

(52) U.S. Cl.
CPC ............ *B60K 7/0015* (2013.01); *B60T 1/065* (2013.01); *B60T 13/12* (2013.01); *B60T 13/22* (2013.01); *F03C 1/0472* (2013.01); *B60K 17/10* (2013.01); *B60K 2007/0038* (2013.01); *B60K 2007/0092* (2013.01)

(58) Field of Classification Search
CPC .......... B60K 7/0015; B60K 2007/0092; B60K 2007/0038
See application file for complete search history.

(56) References Cited

U.S. PATENT DOCUMENTS 5,115,890 A    5/1992  Noel
5,220,790 A *  6/1993  Allart .................... F03C 1/0447
                                                     60/435
5,820,506 A *  10/1998 Mann ................... B60K 7/0015
                                                     475/83
(Continued)

FOREIGN PATENT DOCUMENTS

DE    19805300    8/1999
DE    10006460    8/2001
(Continued)

*Primary Examiner* — Thomas E Lazo
(74) *Attorney, Agent, or Firm* — Occhiuti & Rohlicek LLP

(57) ABSTRACT

A hydraulic motor for vehicle wheel includes a hydrodynamic element, a reaction element, an oil distributor rotating as one with the reaction element, and a brake mounted between the two elements to oppose the rotational movement. The hydrodynamic element has a flange that surrounds the oil distributor. On its radially exterior face, it has means for rotationally coupling with the rotary discs of the brake. The brake is thus positioned around the distributor.

20 Claims, 3 Drawing Sheets

(56) References Cited

U.S. PATENT DOCUMENTS

| | | | |
|---|---|---|---|
| 6,050,173 A * | 4/2000 | Sakai | F03C 1/045 |
| | | | 91/482 |
| 6,135,259 A | 10/2000 | Forster | |
| 6,248,037 B1 * | 6/2001 | Forster | B60K 7/0015 |
| | | | 180/308 |
| 2001/0015300 A1 | 8/2001 | Forster | |

FOREIGN PATENT DOCUMENTS

| | | |
|---|---|---|
| DE | 102009016010 | 10/2010 |
| FR | 2655090 | 5/1991 |

* cited by examiner

HYDRAULIC MOTOR FOR VEHICLE WHEEL

CROSS REFERENCE TO RELATED APPLICATIONS

This application is a National Stage of International Application No. PCT/EP2015/080483 filed on Dec. 18, 2015, which claims priority to French Application No. 1462934 filed on Dec. 19, 2014, the contents of which are hereby incorporated by reference in their entirety.

INTRODUCTION

The invention relates to a hydraulic motor for a vehicle wheel.

PRIOR ART

The invention belongs to the field of hydraulic motors for vehicle wheels. The vehicles in question are notably construction site vehicles, agricultural tractors or other self-propelled agricultural machines, etc., for which it is difficult or impossible to provide a mechanical transmission between the combustion engine and the wheels. This situation is encountered notably with vehicles that have to have a large ground clearance, this being incompatible with the presence of drive shafts connecting the axle of the driving wheels. The combustion engine drives an oil pump which supplies the hydraulic motor with hydraulic energy in the form of high-pressure oil. The main function of this hydraulic motor is to convert the hydraulic energy into mechanical energy for rotating the wheel.

A hydraulic motor for a vehicle wheel is known, comprising:
  a hydrodynamic element having:
  i) cells,
  ii) pistons mounted so as each to slide in a respective cell, defining a variable-volume chamber therein, and
  iii) ducts connected to the chambers,
    a reaction element comprising an annular cam on which an active face of each piston acts,
    a front bearing and a rear bearing, by way of which, at least indirectly, the reaction element and the hydrodynamic element are rotatable with respect to one another,
    a support rotationally linked to one of the elements, the vehicle wheel being rotationally linked to the other element when in use,
    an oil distributor that rotates as one with the reaction element and brings the ducts selectively into communication with an oil supply line and return line depending on its angular position relative to the hydrodynamic element, and
    a brake mounted between the two elements in order to selectively prevent said rotational movement, the brake having at least one first braking surface rotationally coupled to the hydrodynamic element, and a second braking surface rotationally coupled to the reaction element.

A motor that complies with this definition will be known as "motor of the specified type" below.

In general, the reaction element and the distributor are rotationally linked to the support, while the hydrodynamic element turns with the wheel with respect to the support.

The side adjacent to the wheel will be known as the "front" of the motor, and the side away from the wheel will be known as the "rear" of the motor.

Conventionally, on the rear side, the support is fixed to the chassis, optionally by way of a suspension, and on the front side, the hydrodynamic element is directly or indirectly fixed to the wheel. In this case, bearings provided directly or indirectly between the two elements for the relative rotation thereof serve at the same time as load bearings that transmit forces between the chassis of the vehicle and the wheel and also moments about axes transverse to the axis of the motor.

Typically, the brake is at the rear of the motor while the distributor is located between the brake and the two elements per se.

A drawback of the motors according to the prior art is the lack of compactness.

Another drawback of the motors according to the prior art is that it is not possible to supply them from the rear.

Another drawback of the known motors is that they consist of numerous parts.

Yet another drawback of the known motors is that they need to be completely disassembled for most repairs, for example the restoration of the friction parts of the brake, the restoration of particular seals, etc.

The known motors have a long axial length which has the double drawback of impinging laterally on the maximum ground clearance region of the vehicle and of increasing bending moments undergone by the motor on account of the forces to be transmitted between the wheel and the chassis.

An aim of the invention is to remedy all or some of the drawbacks of the prior art and/or to improve the flexibility and simplicity of manufacturing such a motor while retaining or improving the robustness and cost of this manufacture, the maintenance and/or the operation of the means by which a driving wheel hydraulic motor is manufactured.

SUMMARY OF THE INVENTION

At least one aim is achieved with a hydraulic motor for a vehicle wheel of the type specified, in which, according to a first aspect of the invention, the hydrodynamic element is secured to a collar which surrounds the oil distributor and bears, on its radially outer face, means for rotationally coupling to the at least one first braking surface, the brake thus being disposed around the distributor.

Thus, by positioning the brake around the distribution, it is possible to manufacture a motor more compact than those in the prior art. In particular, the motor has a shorter axial length. The motor comprises fewer parts than other known motors, since the collar at the same time forms a sort of casing for the distribution and a brake element.

Moreover, since the brake is no longer positioned behind but around the distributor, the distributor is located close to the rear side of the motor, such that the motor can be supplied from the rear in a manner that is very favorable for the reliability of the connections.

In particular, the supply can be central or substantially central, this being very favorable for reliability and the reduction in pressure drops, since the oil makes a minimum number of turns before reaching the hydrodynamic element.

Typically, the reaction element surrounds the hydrodynamic element.

In a preferred embodiment, the reaction element is fixed at least indirectly to the support and the hydrodynamic element is able to rotate with respect to the support.

According to one particular feature, the brake is of the multi-disk type, and the coupling means are splines formed on the collar. By virtue of the invention, it is possible to benefit from the very advantageous characteristics of this type of brake without suffering the drawback of its long axial length, since the latter is essentially superposed on that of the distributor.

In one embodiment, the oil distributor and the brake have substantially the same axial length.

Given the brake torque that is required by standards, in particular for it to be possible to brake the vehicle even if the hydraulic motor is providing its maximum torque, a brake, in particular of the multi-disk type, has to have a particular axial length depending on its diameter. It has been found according to the invention that these conditions could be realized with a brake surrounding the distributor and having an axial length similar to that of the distributor.

Advantageously, the collar is integral with the hydrodynamic element. In this way, the number of parts is reduced further.

Advantageously, in one embodiment, the hydrodynamic element has, radially on the inside of the collar, a recess delimited by the inner face of the collar and by a shoulder of the hydrodynamic element through which the ducts lead, the oil distributor being essentially housed in the recess and having a polished end face which is in sliding contact with the shoulder and has distribution orifices which communicate selectively with the ducts, depending on the relative angular position of the hydrodynamic element and of the oil distributor.

In one advantageous embodiment, the support is a rear cover of the hydraulic motor, and the collar is directed axially toward the support.

According to a second aspect of the invention, in a hydraulic motor of the specified type that may be in accordance with the first aspect or the improvements thereof, the support is a rear cover of the motor and has a central column about which the oil distributor is mounted, and channeling ducts formed in the column lead through a lateral surface of the column in order to communicate with corresponding manifolds adjacent to a radially inner surface of the oil distributor.

According to one particular feature, at least one distribution slide valve is mounted in a movable manner in the central column in order to control the operating conditions of the hydraulic motor.

Advantageously, in one embodiment, the reaction element has a tubular extension surrounding the brake.

The tubular extension may be integral with the reaction element.

The reaction element may be secured to the support by way of the tubular extension.

The tubular extension and the preferred particular features thereof contribute toward the robustness, simplicity and precision of the assembly.

Preferably, the tubular extension is equipped with coupling means, in particular splines, in order to be coupled to the at least one second braking surface.

In one advantageous embodiment, the rear bearing is fitted directly on a bearing surface formed on the element secured to the tubular extension, and the outside diameter of the rear bearing is smaller than an inside diameter of the coupling means of the extension.

According to a third aspect of the invention, in a hydraulic motor of the specified type, which may be in accordance with one or more of the above aspects or with all or some of the improvements thereof, the two bearings are fitted directly on bearing surfaces formed on the element secured to the collar, and the two bearings each have an inside diameter larger than an outside diameter of the coupling means of the collar.

Advantageously, the two bearings are fitted directly on bearing surfaces formed on each of the two elements.

By virtue of this arrangement, the two bearings ensure excellent coaxiality of the two elements. This reduces operating noise and also the risks of cavitation or overpressure in the volumes taken up by the working oil.

According to a fourth aspect of the invention, in a hydraulic motor of the specified type, which may be in accordance with one or more of the above aspects or with all or some of the improvements thereof, in the support forming a rear cover for the hydraulic motor, brake actuating means are mounted, the brake being disposed axially between the support for the one part and the cam for the other.

In one embodiment, the actuating means comprise an annular piston situated around the other, subjected to the action of a spring in the direction of activation of the brake and adjacent to a hydraulic chamber for deactivation of the brake against the action of the spring.

In one embodiment, the actuating means comprise two annular pistons situated one around the other, one adjacent to a service braking hydraulic chamber in order to activate the brake by application of a hydraulic pressure, the other being subjected to the action of a spring in the direction of activation of the brake and adjacent to a hydraulic chamber for deactivation of the brake against the action of the spring.

Advantageously, the brake actuation means comprise a piston that is urged by a spring in the direction of activation of the brake and is adjacent to a hydraulic chamber for deactivation of the brake against the action of the spring, and the hydraulic motor according to the invention comprises mechanical deactivation means which can be actuated from an outer face of the support in order to move the piston against the action of the spring.

Advantageously, the mechanical deactivation means are axially linked to a service brake annular piston in the direction of deactivation of the brake, and mutual axial supporting means between the two pistons are provided to transmit the deactivation movement generated by the mechanical deactivation means to the piston subjected to the action of the spring.

According to a fifth aspect of the invention, in a hydraulic motor of the specified type, which may be in accordance with one or more of the above aspects or with all or some of the improvements thereof, the hydrodynamic element situated radially inside the reaction element has two successive, rearwardly facing shoulders which progressively reduce the outside diameter of the hydrodynamic element from front to rear, each bearing being mounted on the hydrodynamic element in the vicinity of a respective one of the two shoulders, the two bearings having different inside diameters.

According to a sixth aspect of the invention, in a hydraulic motor of the specified type, which may be in accordance with one or more of the above aspects or with all or some of the improvements thereof, the two elements have an annular interface between one another, along which the annular cam is situated axially between the two bearings.

Preferably, at least one of the two bearings butts against a respective shoulder delimiting the annular cam at one of its annular ends.

According to a seventh aspect of the invention, in a hydraulic motor of the specified type, which may be in accordance with one or more of the above aspects or with all or some of the improvements thereof, the two elements have an annular interface between one another, along which the following are found in the following order, relative to the axial direction:

the front bearing;
the annular cam;
the rear bearing;
the brake.

According to one particular feature, the motor comprises a dynamic seal closing the annular interface between the two elements, the front bearing being situated between the annular cam and the dynamic seal.

In one embodiment, the dynamic seal is removable from a front face of the motor without the hydrodynamic element or reaction element being removed.

According to an eighth aspect of the invention, in a hydraulic motor of the specified type, which may be in accordance with one or more of the above aspects or with all or some of the improvements thereof, in order to access the brake, the two elements are removable as a single assembly, without impairing a dynamic seal which closes the interface on the front side of the hydrodynamic motor. In order to access the brake, the two elements are removable as a single assembly, the hydraulic motor comprising a dynamic seal designed to close the interface on the front side of the hydraulic motor and not to be impaired by removal of said single assembly.

Preferably, notably in the seventh and eighth aspects, the dynamic seal comprises a ring having a polished face which is in sealed and sliding contact with a polished face of one of the elements under a contact pressure generated by an elastic means pressed against a support mounted in a removable manner on the other element.

According to a ninth aspect of the invention, in a hydraulic motor of the specified type, which may be in accordance with one or more of the above aspects or with all or some of the improvements thereof, the hydrodynamic element has, on its radially outer face, a spacer, one side of which can press against the rear bearing and the other side of which has a reaction face for the brake.

Preferably, the spacer is held axially between the rear bearing and an attached ring in a peripheral groove of the hydrodynamic element.

According to a tenth aspect of the invention, in a hydraulic motor of the specified type, which may be in accordance with one or more of the above aspects or with all or some of the improvements thereof, the reaction element may be fixed in at least two different angular positions with respect to the oil distributor, each corresponding to a respective direction of rotation of the hydraulic motor.

This aspect of the invention makes it possible to produce identical motors for the left-hand and right-hand wheels of a vehicle and these intrinsically identical motors are given different directions of rotation through the judicious choice, for each one, of the angular position of the reaction element with respect to the distributor.

Preferably, the reaction element is fixed to the support by screws distributed angularly about an axis of the motor at a regular spacing chosen with respect to a succession spacing of lobes of the annular cam in order to allow the two different angular positions mentioned above.

According to an eleventh aspect of the invention, in a hydraulic motor of the specified type, which may be in accordance with at least one of the above aspects or with all or some of the improvements thereof, the oil distributor is adjacent to an interface defining at least one annular manifold, the interface having different diameters on either side of the manifold in order that the pressurized oil generates a differential axial thrust force on the oil distributor.

DESCRIPTION OF THE FIGURES

Further particular features and advantages of the invention will become apparent from reading the detailed description of entirely nonlimiting implementations and embodiments, with reference to the appended figures, in which.

DESCRIPTION OF THE INVENTION

Because these embodiments are entirely nonlimiting, it is notably possible to realize variants of the invention that comprise only a selection of features described below, as described or generalized, in isolation from the other features described, if this selection of features is sufficient to confer a technical advantage or to differentiate the invention from the prior art.

Figure 1:
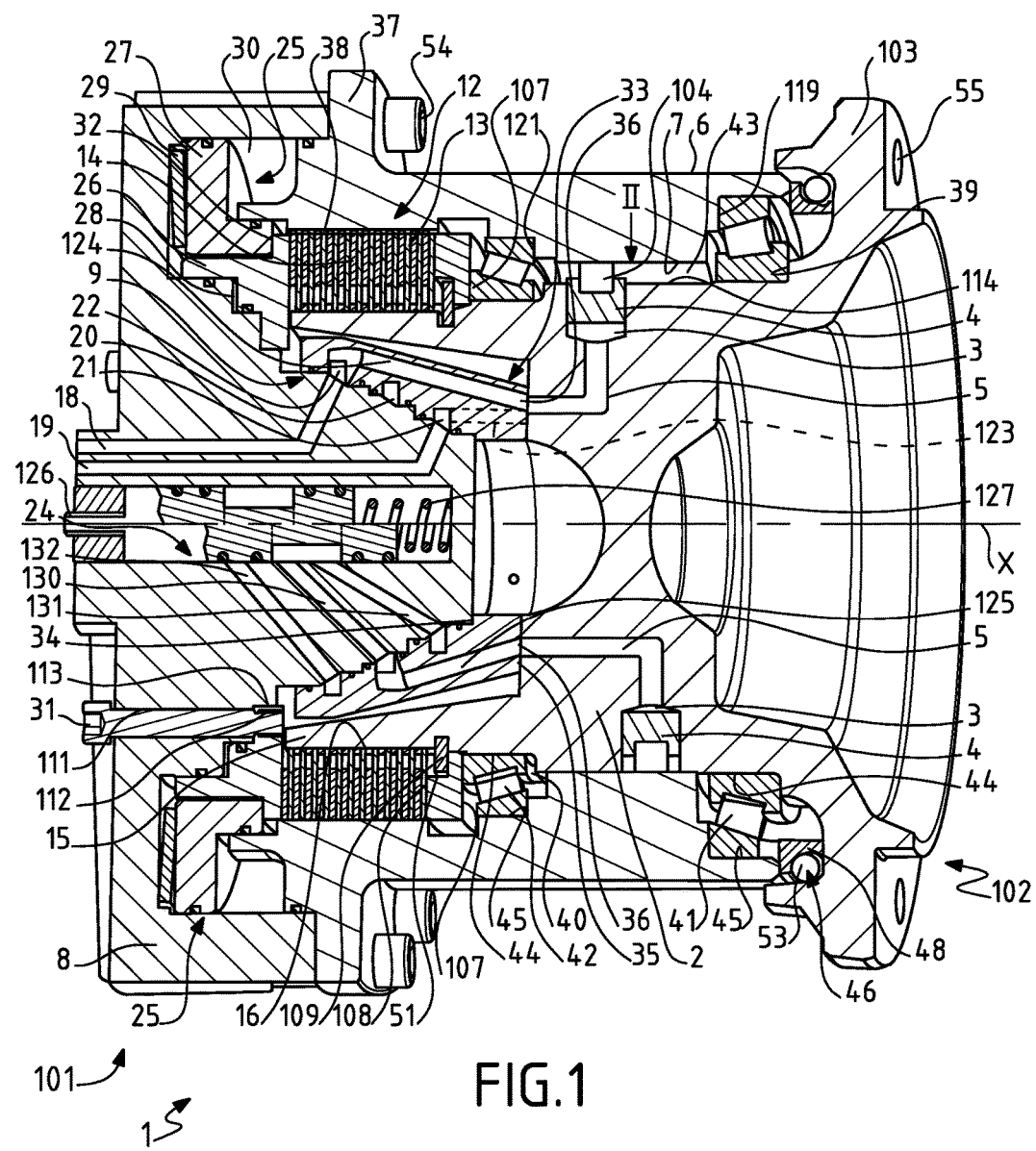
FIG. 1 is a view in axial section of a hydraulic motor according to the invention.

FIG. 1 illustrates a hydraulic motor 1 for a vehicle wheel that rotates about an axial direction X which constitutes at the same time the axis of the hydraulic motor 1.

The motor comprises a stator 101 and a rotor 102 which rotate with respect to one another about the axis X. The rotor 102 comprises, at the front of the motor, a flange 103 provided for fastening the wheel by virtue of threaded holes 55. The stator 101 comprises a support 8 which is a rear cover of the hydraulic motor 1 and which is fixed to the chassis of the vehicle, optionally by way of a suspension and/or a steering pivot pin.

In the embodiment described, the hydraulic motor 1 is designed to be the only mechanical link between the wheel and the chassis or the suspension of the vehicle, and as such it transmits all of the forces and moments between the chassis and the wheel.

The hydraulic motor 1 has the function of converting hydraulic energy into mechanical rotation energy of the rotor 102 with respect to the stator 101. To this end, it comprises two interactive elements that rotate with respect to one another about the axis X, namely a hydrodynamic element 2 on which the pressurized oil acts, and a reaction element 6, one of which is secured to the stator 101 so as to rotate therewith and the other of which is secured to the rotor 102 so as to rotate therewith, and which are disposed around one another.

In the embodiment shown, the hydrodynamic element 2 is secured to the rotor 102 and the reaction element 6 is secured to the stator 101. In a typical embodiment, as shown, the reaction element 6 surrounds the hydrodynamic element 2.

Figure 2:
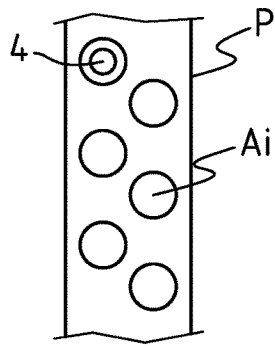
FIG. 2 is a schematic view along the arrow II in FIG. 1.

The hydrodynamic element 2 comprises an external cylindrical wall 114 in which cells Ai have been bored along a radial axis with respect to the axis X, as illustrated in FIG. 2. Pistons 4 are mounted so as each to slide radially in one of the cells Ai in each case and define a variable volume chamber 3 radially on the inside therein.

Figure 3:
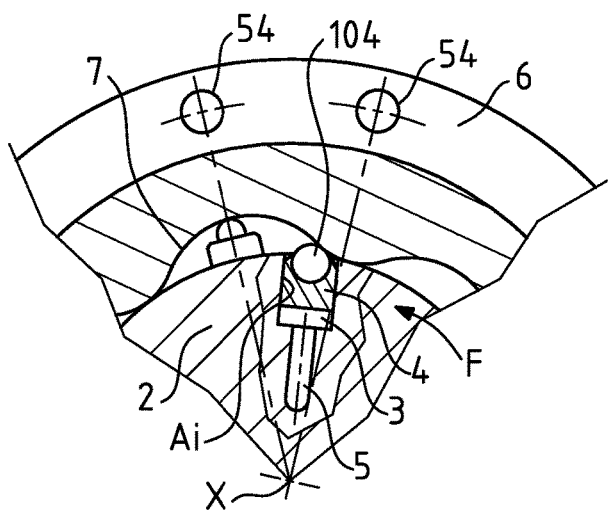
FIG. 3 is a partial schematic view of the hydraulic motor according to the invention in section in a radial plane.

As also shown in FIG. 3, each piston 4 has, on an active face opposite the chamber 3, thus radially facing the reaction element 6, a roller 104 which rolls on an annular cam 7 having multiple lobes regularly distributed angularly about the axis X. The cam 7 is formed on the radially inner face of the reaction element 6.

In a manner not shown any further, the roller 104 is rotationally supported on the piston 4 by way of a pad such that, in service, the roller 104 turns virtually without friction with respect to the piston 4 and rolls without sliding on the annular cam 7.

Each chamber 3 is connected to an oil distributor 9 by a respective duct 5 formed in the hydrodynamic element 2. The oil distributor 9 is secured to the reaction element 6 so as to rotate therewith.

At an interface 34, 35 between the hydrodynamic element 2 and the distributor 9, each duct 5 communicates selectively with a high-pressure oil inlet manifold 22, an oil return manifold 21, an intermediate manifold 20, or none of the three manifolds 20, 21, 22, depending on the relative angular position of the two elements 2 and 6. The interface 34, 35 is made up of a shoulder 34 of the rotor 102 and by an adjacent face 35 of the distributor.

The shoulder 34 and the adjacent face 35 of the distributor are flat faces, perpendicular to the axis X, provided with a mirror polish, which are in sealed contact with one another with regard to the working oil even at high pressure, and which slide against one another when the hydrodynamic element 2 is rotating with respect to the distributor 9 secured to the stator 102. The ducts 5 connected to the chambers 3 lead through the shoulder 34 and, depending on the relative angular position of the stator 101 and of the rotor 102, communicate selectively with orifices 36 of the ducts 123, 124, 125 formed in the oil distributor 9. Some 123 of the ducts are connected to the low-pressure manifold 21, others 124 to the high-pressure manifold 22, and yet others 125 to the intermediate manifold 20, depending on the respective angular position of the orifices 36 with respect to the lobes of the cam 7.

In operation, the motor has the function of generating a torque in the direction of relative movement of the two elements 2, 6. To this end, the duct 5 associated with each piston 4 communicates with the high-pressure manifold 22 when, as shown in FIG. 3, depending on the direction of rotation of the hydrodynamic element 2 indicated by the arrow F, the roller 104 moves from the top of one lobe to the cavity between two lobes. In this case, the piston subjected to the radial force, with respect to the axis X, generated by the high-pressure oil exerts, on the oblique face of the cam, a force having a circumferential component that contributes to the motor torque. When, by contrast, the roller 104 is in the process of rising toward the top of a lobe, the duct 5 communicates with the oil return manifold 21. The oblique face of the lobe pushes the piston back toward the end of the chamber 3 and, as a result, returns depressurized oil toward the intake of the pump situated on the vehicle. When the roller 104 is at the top of a lobe or in the cavity between two lobes, the duct 5 does not communicate with the high-pressure oil or with the oil return.

The above relates to the operation of a single-speed motor, or low-speed and high-torque operation in a two-speed motor, such as the one shown in FIG. 1. These motors having at least two speeds are capable of at least one operating condition in which the pistons 4 are deactivated and to this end communicate with the oil return while their roller moves from the top to the cavity of certain lobes of the cam. This has the aim of reducing the torque and increasing the speed of rotation of the rotor 101, with the flow of high-pressure oil being distributed to a smaller number of pistons 4. In order that the pistons 4 are selectively active or inactive on a lobe, the orifice 36 which communicates with the chamber 3 when the piston 4 descends from the top to the cavity of this lobe is connected to the intermediate manifold 20 by a duct 125. The intermediate manifold 20 is selectively connected to the high-pressure manifold 22 or to the oil return manifold 21 by virtue of a slide valve 24.

In FIG. 1, the slide valve 24 is shown in its two possible positions, namely with active lobes above the axis X and inactive lobes below the axis X. The slide valve 24 is controlled by the driver of the vehicle, by a single-acting hydraulic control that arrives through a connector 126 and is returned by a spring 127.

In a motor having only one operating condition, there would be no intermediate manifold 20 or slide valve 24 and all of the orifices 36 would be connected either to the high-pressure manifold such as 22 or to the oil return manifold such as 21.

In order to increase the number of pistons and thus the torque and the power of the motor to a reasonable extent, there are two rows of pistons in adjacent radial planes (FIGS. 1 and 2). In order to smooth the torque produced by the motor, the pistons of each row are in two intermediate angular positions between those of the pistons of the other row. The pistons of one row are partially interlocked between the pistons of the other row, for the purpose of spatial optimization. In a variant of the invention, there could be only one row of pistons, or more than two rows.

The hydraulic motor 1 also comprises a brake 12 mounted functionally between the reaction element 6 and the hydrodynamic element 2.

The brake 12 selectively opposes the rotational movement of the hydraulic motor 1 and has at least one second braking surface rotationally coupled to the reaction element 6 and at least one first braking surface rotationally coupled to the hydrodynamic element 2.

In the embodiment shown, the brake 12 is of the oil bath multi-disk type comprising an alternating stack of thin steel disks 13 rotationally coupled to one of the elements, in this case the hydrodynamic element 2, and thicker disks 14 rotationally coupled to the other element, in this case the reaction element 6. The disks 14 are formed of a metal core, the two opposite faces of which are lined with a friction material combined with the steel of the disks 13. The braking surfaces are the faces of these disks 13, 14. The means for activation and deactivation of the brake 12 are described below.

According to one aspect of the invention, the hydrodynamic element 2 is secured to and integral with a collar 15 that has a cylindrical overall shape about the axis X and is directed axially rearward, in particular toward the support 8. The collar 15 surrounds the oil distributor 9.

At its front end, the radially inner face of the collar 15 is connected to the above-described shoulder 34, which is thus one face of the hydrodynamic element 2 and which defines, with said radially inner face of the collar, a recess 33 housing the distributor 9.

The collar 15 is surrounded by the brake 12. In particular, the collar 15 bears, on its radially outer face, means 16 for rotationally coupling to one of the sets of disks 13, 14, in this case the steel disks 13. The coupling means 16 are axial splines formed on the collar 15, which engage with teeth formed along the radially inner edge of the disks 13, such that the disks 13 are rotationally linked to the hydrodynamic element 2 while being able to slide axially with respect thereto.

The reaction element 6 has a tubular extension 37 secured to and integral with the cam 7. The extension 37 secures the reaction element 6 to the support 8 by means of screws 54 distributed angularly about the axis of rotation X of the hydraulic motor 1. The reaction element 6 can be fixed in at least two different angular positions with respect to the oil distributor 9, each corresponding to a respective direction of rotation of the hydraulic motor 1. To this end, as illustrated in FIG. 3, the distribution spacing of the screws is equal to (n–0.5) times the succession spacing of the lobes of the cam 7, n being an integer which, in the example shown, is equal to 1. Thus, with a minor adaptation to the design, consisting in choosing the angular position of the reaction element 6 with respect to the support 8 to which the distributor 9 is secured, it is possible to produce motors that turn in one direction or the other, for the right-hand and left-hand driving wheels of a vehicle.

The tubular extension 37 surrounds the collar 15, with the brake 12 being interposed. The tubular extension 37 is equipped with coupling means 38 for coupling it to the other set of disks, in this case the thicker disks 14. The coupling means 38 are axial splines formed on the radially inner face of the extension 37, which engage with teeth formed along the radially outer edge of the disks 14, such that the disks 14 are rotationally linked to the reaction element 6 but are able to slide axially with respect thereto.

The axial length of the brake 12 is similar to the axial length of the oil distributor 9.

The support 8 has a central column 17 extending along the axis X, about which the distributor 9 is arranged, which has an annular shape. The distribution slide valve 24 is mounted in a movable manner in the central column 17 so as to control the operating conditions of the hydraulic motor 1.

The central column 17 is pierced by a high-pressure oil supply duct 18 and an oil return duct 19 which lead through a lateral surface of the central column 17 so as to communicate with the manifolds 22 and 21, respectively, which are formed at the interface between a radially inner surface of the oil distributor 9 and the radially outer surface of the central column 17.

The ducts 18 and 19 are intended to be connected permanently to the delivery orifice and to the intake orifice, respectively, of an oil pump mounted on the chassis of the vehicle.

In order to selectively connect the intermediate manifold 20 to one or the other of the manifolds 21, 22, the manifolds 20, 21 and 22 are connected to the housing of the slide valve 24 by ducts 18 and 19, or 130, 131, 132, respectively, formed inside the column.

According to one particular feature, the manifolds 20, 21, 22 are formed by peripheral grooves at the interface with the column 17. The column 17 has a diameter that increases toward the rear, such that the interface diameter is greater at the rear of each manifold 20, 21 or 22 than at the front of this manifold. This results in a differential axial thrust force on the oil distributor 9, directed toward the front, which presses together the faces 34 and 35 with a force proportionate to the oil pressure. In particular, the axial force thus produced balances the thrust force in the opposite direction that is exerted by the pressurized oil in the orifices 36.

The hydraulic motor also comprises a front bearing 41 and a rear bearing 42, by way of which the stator 102 and the rotor 101 are rotatable with respect to one another.

The bearings 41, 42 transmit the forces between the wheel and the chassis. The cam 7 and the hydrodynamic element 2 per se, that is to say the region in which the pistons 3 and the chambers 5 are located, are situated axially between the front bearing 41 and the rear bearing 42.

According to one aspect of the invention, the bearings 41, 42 are mounted directly between the hydrodynamic element 2 and the reaction element 6. More specifically, the body of the hydrodynamic element 2 comprises two outer bearing surfaces 44 on which inner rings of the two bearings 41, 42 are directly fitted, and the reaction element 6 comprises two inner bearing faces 45 in which outer rings of the two bearings 41, 42 are directly fitted.

In one embodiment, the two bearings 41, 42 are of the tapered roller type mounted head to tail so that each bearing resists the axial forces in a respective direction.

The rear bearing 42 is mounted axially between the cam 7 and the brake 12.

The hydrodynamic element 2 has two successive shoulders 39, 40 that face rearward and progressively reduce the outside diameter of the hydrodynamic element from the front to the rear.

The front bearing 41 is mounted so as to transmit the rearwardly directed axial forces from the hydrodynamic element 2 to the reaction element 6. To this end, the inner ring of the front bearing 41 butts against the shoulder 39.

The rear bearing 42 is mounted so as to transmit the forwardly directed axial forces from the hydrodynamic element 2 to the reaction element 6. The inner ring of the rear bearing 42 is adjacent to the shoulder 40 without butting against it.

Since the shoulder 40 brings about a smaller diameter of the rear bearing surface 44 compared with the front bearing surface 44, the two bearings have different inside diameters.

These two diameters are both greater than the outside diameter of the splines 16 formed on the collar 15 in order to allow the bearings 41, 42 to be mounted on the hydrodynamic element 2 from the rear. On its outer face, the hydrodynamic element 2 has an annular spacer 51, a front face 107 of which axially positions the rear bearing 42 and the rear face 108 of which constitutes a reaction face for the brake 12. The annular spacer 51 is kept axially in position between the inner ring of the rear bearing and a removable ring 109 inserted into a peripheral groove in the hydrodynamic element 2. The removable ring 109 can be an open ring, the diameter of which can be increased by elastic deformation so as to allow the ring 109 to be inserted into the groove. The ring 109 can also be formed by two half-rings joined together along an axial joint face by removable connecting means.

On the radially inner side of the reaction element 6, the cam 7 protrudes radially between two shoulders 119, 121, against each of which the outer ring of the one of the bearings 41, 42, respectively, butts.

The inside diameter of the splines 38 of the reaction element 6 is greater than the outside diameter of the rear bearing 42, so as to allow the bearing 42 to be mounted from the rear of the reaction element 6.

In order to repair the brake, the removal of the screws 54 makes it possible to separate the rear support 8 from the two elements 2, 6, which remain joined together by virtue of the spacer 51 and the ring 109 that locks the latter. The brake disks can then be replaced.

If the motor per se has to be disassembled, this is possible, after the screws 54 have been removed, by removing the brake disks from the rear and by removing the ring 109, thereby making it possible withdraw the hydrodynamic element by way of an axial movement toward the front (the right in FIG. 1) relative to the reaction element 6.

Actuating means 25 for the brake 12 are mounted in the support 8 forming a cover. The actuating means 25 comprise two annular pistons 26, 27 situated one around the other, and a mechanical deactivation means 31 in thread engagement with the support 8.

The annular piston 26 is adjacent to a service braking hydraulic chamber 28 for activating the brake 12 by application of a hydraulic pressure. Thus, the pressurization of the hydraulic chamber 28 causes service braking, which the driver of the vehicle actuates in order to slow the vehicle down or bring it to a standstill when it is moving or stopped for a short period.

When the annular chamber 28 is subjected to an oil pressure, the piston 26 pushes the stack of disks 13, 14 against the spacer 51, which is pressed axially onto the reaction element 6 by way of the rear bearing 41, which transmits the axial forces toward the front given the direction of its cone shape.

The annular piston 27 is a parking brake piston and is subjected to the action of a spring 29, in the example a Belleville washer, in the direction of activation of the brake 12. The piston 27 is adjacent to a hydraulic chamber 30 for deactivating the brake 12 against the action of the spring 29.

When the vehicle is at a standstill for a certain period, for example when its engine is stopped, the deactivation chamber 30 is depressurized and the spring 29 pushes the piston 27 in the direction of clamping the stack of disks against the spacer 51. When the vehicle is started up, the chamber 30 is, automatically or manually, resupplied and the oil pressure in the chamber 30 inhibits the piston 27, allowing the brake 12 to be controlled only by the service brake piston 26.

In the embodiment shown, for parking braking, the parking brake piston 27 does not act directly on the stack of disks but by way of the piston 26, which, to this end, has a rearwardly directed shoulder 32.

According to one embodiment, the hydraulic motor comprises means for mechanically deactivating the parking brake so as to make it possible to release the rotor 102 when there is no pressure in the chamber 30, notably in the event of damage to the vehicle. The mechanical deactivation means comprise screws 31, the heads of which are accessible from the rear of the support 8. The screws pass through plain holes 111 in the support and are in thread engagement with tapped holes 112 formed in a flange 113 of the piston 26. By turning the screws 31 in the screwing direction, the piston 26 is pulled toward the rear, which, by way of its shoulder 32, drives the piston 27 against the action of the spring 29.

Axially along the annular interface 43 between the hydrodynamic element 2 and the reaction element 6, from the front to the rear, there are a dynamic seal 46 which closes the interface in a sealed manner at its front end, the front bearing 41, the cam 7 next to the cylindrical wall 114 of the hydrodynamic element, the rear bearing 42, the brake 12, and a part of the brake actuating means 25.

The dynamic seal 46 comprises a ring 48 that is secured to the hydrodynamic element 2 so as to rotate therewith and which has a rear face 49 pressed against a front face 50 of the reaction element 6. The faces 49 and 50 are flat, perpendicular to the axis X, and machined with a mirror polish. The mutual axial pressing force of the two surfaces is generated by the deformation of an O-ring 53 inserted between the ring 48 and the flange 103. At the same time, the O-ring 3 ensures sealing between the ring 48 and the body of the hydrodynamic element 2 and, by friction, the driving of the ring 48 in rotation by the hydrodynamic element 2.

Figure 4:
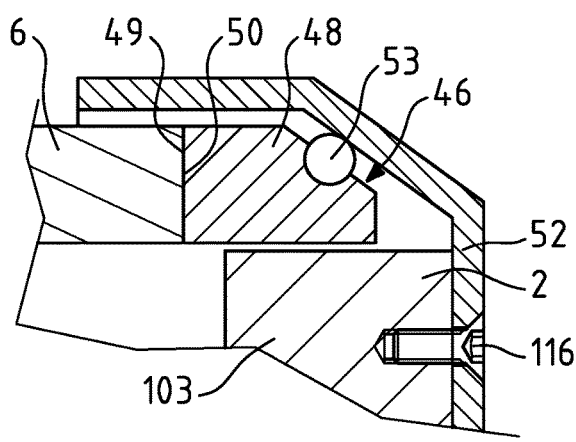
FIG. 4 is a schematic view of a dynamic seal in a variant of the hydraulic motor according to the invention.

In a variant embodiment shown in FIG. 4, the dynamic seal 46 comprises a cup 52 fastened removably to the hydrodynamic element 2 by screws 116. Instead of pressing directly on the element 2, the O-ring 53 is pressed against the cup 52. In order to restore the dynamic seal 46, all that is necessary is to remove the cup 52 and replace the ring 48 and/or the O-ring 52, which have an inside diameter greater than the outside diameter of the flange 103, without having to further disassemble the hydraulic motor 1.

Figure 5:
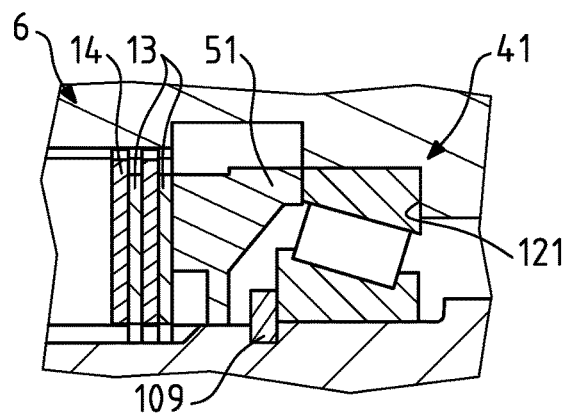
FIG. 5 shows a variant embodiment in a view in partial axial section.

In the embodiment in FIG. 5, the spacer 51 is interposed between the disk pack 13, 14 and the radially outer ring of the rear bearing 42, itself butting against the shoulder 121 of the reaction element 6. In other words, the reaction force that the shoulder 121 sets against the braking force if the brake is activated is no longer transmitted through the rolling bodies (rollers) of the bearing. The removable ring 109 now only serves to stop the inner ring of the rear bearing 42 axially toward the rear. It is now located in front of the spacer 51 and not behind the latter. After the disks have been removed, the spacer 51 is able to be withdrawn toward the rear and there is then access to the ring 109 for the removal of the latter so that the element 2 can be withdrawn by an axial forward movement with respect to the reaction element 6. Otherwise, this embodiment is identical to the one in FIGS. 1 to 3 or to the one in FIG. 4.

Figure 6:
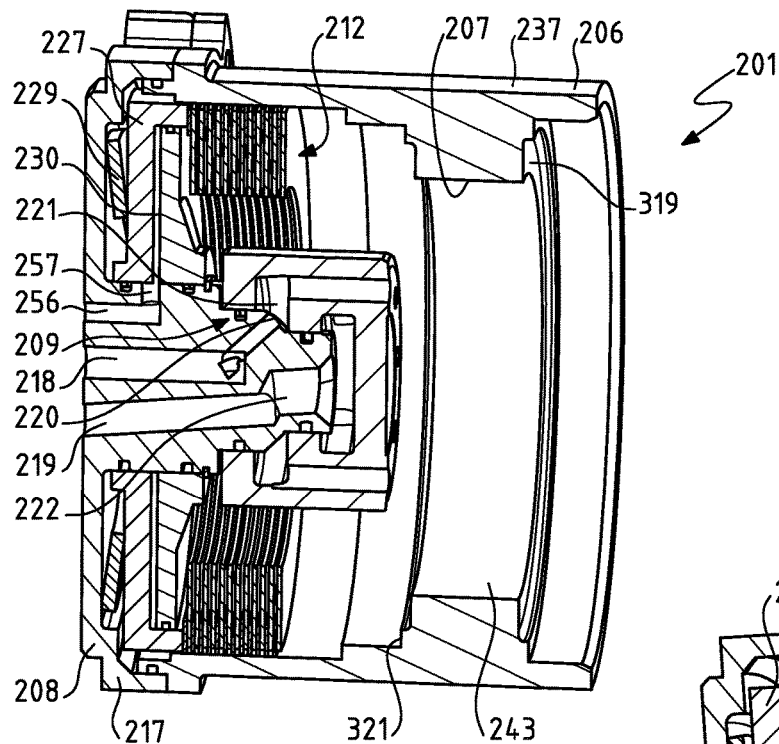
FIG. 6 is a view in axial section of a variant of a hydraulic motor according to the invention.
Figure 7:
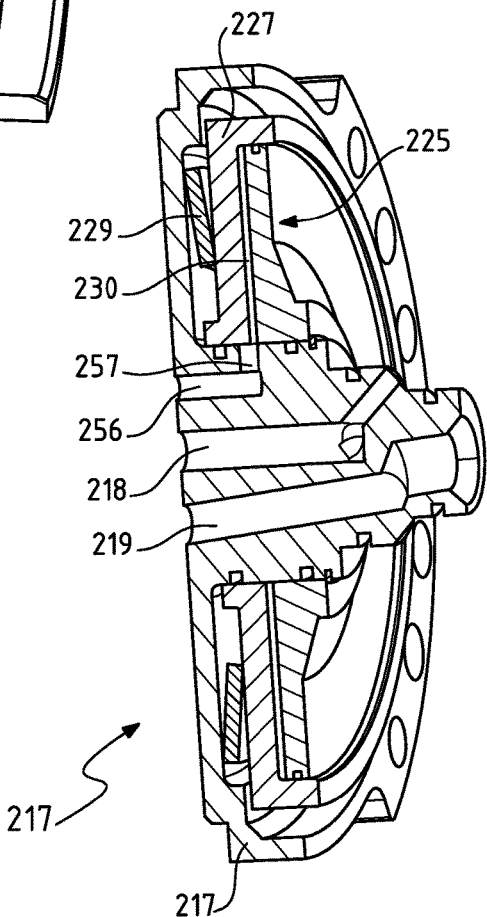
FIG. 7 is a view in axial section in the region of the rear part of the variant of the motor.

FIG. 6 shows a view in axial section of a variant of a hydraulic motor according to the invention. Only the differences between the above-described motor and this variant will be described here. Above-described elements have references increased by 200 in FIGS. 6 and 7. FIG. 7 is a view in axial section through the column 217.

The central column 217 is furthermore pierced by a pressurized oil supply duct 256 for supplying high-pressure oil, which leads through a lateral surface of the central column 217 in order to communicate with a manifold 257. The manifold 257 is formed at the interface between a radially inner surface of the oil distributor 209 and the radially outer surface of the central column 217.

The duct 256 is intended to be connected permanently to an orifice for delivering pressurized oil coming from the vehicle that is intended to deactivate the brake 212.

Actuating means 225 for the brake 212 are mounted in the support 208 forming a cover. The actuating means 225 comprise an annular piston 227.

The annular piston 227 is a parking brake piston and is subjected to the action of a spring 229, in the example a Belleville washer, in the direction of activation of the brake 212. The piston 227 is adjacent to a hydraulic chamber 230 for deactivating the brake 212 against the action of the spring 229.

When the vehicle is at a standstill for a certain period, for example when its engine is stopped, the deactivation chamber 230 is depressurized and the spring 229 pushes the piston 227 in the direction of clamping the stack of disks. When the vehicle is started up, the chamber 230 is, automatically or manually, resupplied and the oil pressure in the chamber 230 inhibits the piston 227.

Of course, the invention is not limited to the examples that have just been described and numerous variations may be made to these examples without departing from the scope of the invention. In addition, the various features, forms, alternatives and embodiments of the invention may be combined with one another in various combinations insofar as they are not mutually incompatible or mutually exclusive.

NOMENCLATURE

1, 201 Hydraulic motor
2 Hydrodynamic element
3 Chamber
4 Piston
5 Duct
6, 206 Reaction element
7, 207 Annular cam 8, 208 Support
9, 209 Oil distributor
12, 212 Brake
13, 14 Disks
15 Collar
16 Means for rotationally coupling
17, 217 Central column
18, 218 High-pressure oil supply duct
19, 219 Oil return duct
20, 220 Intermediate manifold
21, 221 Oil inlet manifold
22, 222 Oil return manifold
24 Distribution slide valve
25 Brake actuating means
26 Service brake piston
27 Parking brake piston
28 Service braking hydraulic chamber
29 Spring
30 Hydraulic chamber for deactivating the brake
31 Screw
32 Mutual axial supporting shoulder
33 Recess
34 Shoulder
35 Face adjacent to the shoulder
36 Orifices
37, 237 Tubular extension of the reaction element
38 Coupling means of the tubular extension
39, 40 Successive shoulders of the hydrodynamic element
41 Front bearing
42 Rear bearing
43, 243 Annular interface
44, 45 Bearing surfaces of rolling bearings
46 Dynamic seal
48 Dynamic seal ring
49 Polished face of the ring
50 Polished face of one of the elements
51 Spacer
52 Cup
53 Elastic means
54 Fastening screw of the reaction element
55 Threaded holes in the hydrodynamic element
101 Motor stator
102 Motor rotor
103 Flange
104 Piston roller
107 Front face of the spacer
108 Rear face of the spacer
109 Ring
111 Plain holes in the support
112 Tapped holes
113 Flange of the piston 26
114 External cylindrical wall
116 Screw
119, 121, 319, 321 Shoulders
123, 124, 125 Ducts in the distributor
126 Hydraulic connectors
127 Spring
130, 131, 132 Ducts in the column
Ai Cells
F Direction of rotation of the element 2
X Axis of rotation of the hydraulic motor

The invention claimed is:

1. An apparatus comprising a hydraulic motor for a vehicle wheel, said hydraulic motor comprising a hydrodynamic element, a reaction element, a front bearing, a rear bearing, a support, an oil distributor, and a brake, wherein said hydrodynamic element comprises cells, pistons mounted so as each to slide in a respective cell, thereby defining a variable-volume chamber therein, and ducts that lead into said cells in order to communicate with said chambers, wherein said reaction element comprises an annular cam on which an active face of each piston acts, wherein said front and rear bearings at least indirectly enable said reaction element and said hydrodynamic element to rotate with respect to each other about an axis of rotation, wherein said support is rotationally linked to one of said elements, said vehicle wheel being rotationally linked to the other of said elements when in use, wherein said oil distributor rotates as one with said reaction element and brings said ducts selectively into communication with an oil supply line and a return line depending on an angular position thereof relative to said hydrodynamic element, and wherein said brake is mounted functionally between said two elements in order to selectively prevent rotational movement, said brake having at least one first braking surface rotationally coupled to said hydrodynamic element, and a second braking surface rotationally coupled to said reaction element, wherein each piston is mounted radially with respect to the axis of rotation, and wherein said hydrodynamic element is secured to a collar that surrounds said oil distributor and that bears, on a radially outer face thereof, means for rotationally coupling to said at least one first braking surface, said brake thus being disposed around said distributor.

2. The apparatus of claim 1, wherein said reaction element surrounds said hydrodynamic element and is fixed at least indirectly to said support, and wherein said hydrodynamic element is able to rotate with respect to said support.

3. The apparatus of claim 1, wherein said brake is a multi-disk brake, and wherein said coupling means comprises splines formed on said collar.

4. The apparatus of claim 1, wherein said oil distributor and said brake have substantially the same axial length.

5. The apparatus of claim 1, wherein said collar is integral with said hydrodynamic element.

6. The apparatus of claim 1, wherein said hydrodynamic element comprises, radially on said inside of said collar, a recess delimited by said inner face of said collar and by a shoulder of said hydrodynamic element through which said ducts lead, said oil distributor being housed in said recess and having a polished end-face that is in sliding contact with said shoulder and that has distribution orifices that communicate selectively with said ducts depending on a relative angular position of between hydrodynamic element and said oil distributor.

7. The apparatus of claim 1, wherein said support comprises a rear cover of said hydraulic motor and a central column about which said oil distributor is mounted, and wherein oil channeling ducts formed in said central column lead through a lateral surface of said central column to communicate with corresponding manifolds adjacent to a radially-inner surface of said oil distributor.

8. The apparatus of claim 7, further comprising a distribution slide valve movably mounted in said central column to control operating condition of said hydraulic motor.

9. The apparatus of claim 1, wherein said reaction element comprises a tubular extension surrounding said brake.

10. The apparatus of claim 9, wherein said tubular extension is integral with said reaction element.

11. The apparatus of claim 9, wherein said reaction element is secured to said support by way of said tubular extension.

12. The apparatus of claim 9, wherein said tubular extension comprises splines to permit coupling thereof to said second braking surface.

13. The apparatus of claim 9, wherein said rear bearing is fitted directly on a bearing surface formed on said element secured to said tubular extension, and wherein said outside diameter of said rear bearing is smaller than an inside diameter of said coupling means of said tubular extension.

14. The apparatus of claim 1, wherein said bearings are fitted directly on bearing surfaces formed on said element secured to said collar, and wherein said bearings each have an inside diameter that is larger than an outside diameter of said coupling means of said collar.

15. The apparatus of claim 1, wherein said two bearings are fitted directly on bearing surfaces formed on each of said two elements.

16. The apparatus of claim 1, further comprising brake-actuating means mounted in said support forming a rear cover for said hydraulic motor, said brake being disposed axially between said support for one part and said cam for said other, said actuating means comprising two annular pistons situated one around the other, one adjacent to a service braking hydraulic chamber in order to activate said brake by application of a hydraulic pressure, said other being subjected to action of a spring in a direction of activation of said brake and adjacent to a hydraulic chamber for deactivation of said brake against action of said spring.

17. The apparatus of claim 16, wherein said brake actuation means comprises a piston that is urged by a spring in a direction of activation of said brake and that is adjacent to a hydraulic chamber for deactivation of said brake against action of said spring, wherein said apparatus further comprises mechanical deactivation means that can be actuated from an outer face of said support in order to move said piston against action of said spring, said mechanical deactivation means being axially linked to a service brake annular piston in a direction of deactivation of said brake, and wherein mutual axial supporting means between said two pistons are provided to transmit said deactivation movement generated by said mechanical deactivation means to said piston subjected to action of said spring.

18. The apparatus of claim 1, wherein said hydrodynamic element mounted radially inside said reaction element has two successive, rearwardly facing shoulders which progressively reduce said outside diameter of said hydrodynamic element from front to rear, and in that each bearing is mounted on said hydrodynamic element, butting against a respective one of said two shoulders, said two bearings having different inside diameters.

19. The apparatus of claim 1, wherein said two elements comprise an annular interface between one another, along which the following are found in the following order relative to the said axial direction: said front bearing, said annular cam, said rear bearing, and said brake, wherein said hydraulic motor comprises a dynamic seal that closes said annular interface between said two elements, said front bearing being situated between said annular cam and said dynamic seal, wherein said dynamic seal comprises a ring having a polished face that is in sealed and in sliding contact with a polished face of one of said elements under a contact pressure generated by an elastic means pressed against a cup mounted in a removable manner on said other element.

20. The apparatus of claim 1, wherein said hydrodynamic element comprises, on a radially outer face thereof, a spacer having first and second sides, wherein said first side can press against said rear bearing and wherein said second side has a reaction face for said brake.

* * * * *